United States Patent
Iu et al.

(10) Patent No.: US 8,188,159 B2
(45) Date of Patent: *May 29, 2012

(54) ENVIRONMENTALLY FRIENDLY ADDITIVES FOR INKJET INKS

(75) Inventors: Kai-Kong Iu, San Diego, CA (US); Dennis P. Parazak, San Diego, CA (US); James M. Pingel, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1221 days.

This patent is subject to a terminal disclaimer.

(21) Appl. No.: 11/249,598

(22) Filed: Oct. 13, 2005

(65) Prior Publication Data

US 2007/0088101 A1   Apr. 19, 2007

(51) Int. Cl.
| | |
|---|---|
| B05D 1/32 | (2006.01) |
| B41J 2/01 | (2006.01) |
| B41J 2/17 | (2006.01) |
| B41J 2/175 | (2006.01) |
| C08G 67/02 | (2006.01) |
| C08J 3/00 | (2006.01) |
| C08K 3/20 | (2006.01) |
| C08L 85/00 | (2006.01) |
| C08L 85/02 | (2006.01) |
| C09D 5/00 | (2006.01) |
| C09D 11/00 | (2006.01) |
| G01D 11/00 | (2006.01) |

(52) U.S. Cl. ........... 523/160; 106/31.13; 347/1; 347/85; 347/95; 347/100; 427/466; 523/161; 524/610; 524/612

(58) Field of Classification Search .................. 523/160, 523/161; 524/610, 612; 427/466; 347/1, 347/85, 95, 100; 106/31.13
See application file for complete search history.

(56) References Cited

U.S. PATENT DOCUMENTS

| | | | |
|---|---|---|---|
| 5,401,303 A * | 3/1995 | Stoffel et al. | 106/31.43 |
| 6,660,828 B2 | 12/2003 | Thomas et al. | |
| 7,479,178 B2 * | 1/2009 | Dodge et al. | 106/31.46 |
| 2004/0071953 A1 | 4/2004 | Sobieski | |
| 2007/0120928 A1 * | 5/2007 | Ma et al. | 347/100 |
| 2007/0181034 A1 * | 8/2007 | Dodge et al. | 106/31.46 |

FOREIGN PATENT DOCUMENTS

| | | |
|---|---|---|
| EP | 1 138 729 A1 | 10/2001 |
| EP | 1 403 345 A | 3/2004 |
| EP | 1 426 193 A1 | 6/2004 |
| WO | WO-2004030918 | 4/2004 |
| WO | WO 2006/083000 A | 8/2006 |

OTHER PUBLICATIONS

Kausch, Charles M. et al., "Synthesis, Characterization, and Unusual Surface Activity of a Series of Novel Architecture, Water-Dispersible Poly(fluorooxetane)s", Langmuir, 2002, 18, 5933-5938.*
Kausch et al., "Synthesis, Characterization, and Unusual Surface Activity of a Series of Novel Architecture, Water-Dispersible Poly(fluorooxetane)s", Langmuir, 2002, 18, 5933-5938.*
OMNOVA Solutions Inc., PolyFox Surfactants.

* cited by examiner

Primary Examiner — Patrick Niland

(57) ABSTRACT

An inkjet ink comprising polymeric fluoro-polymeric additives providing enhanced pen and print quality performance.

32 Claims, 3 Drawing Sheets

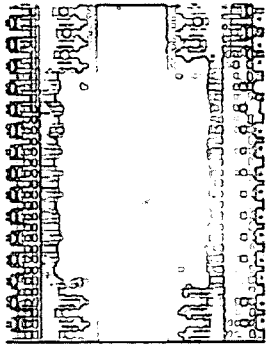
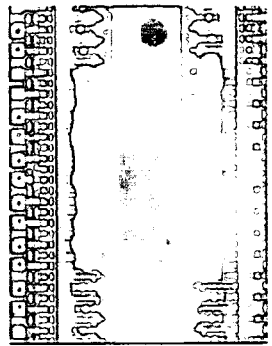
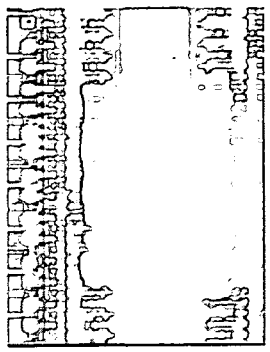
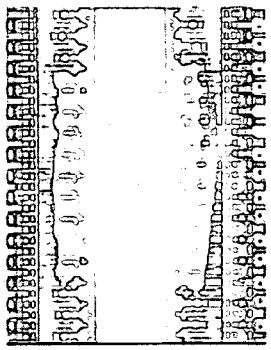
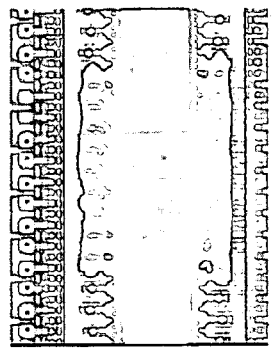
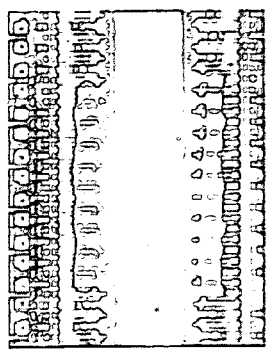
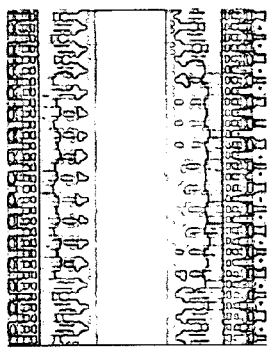
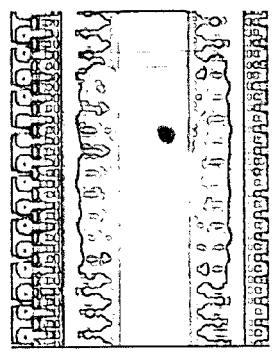
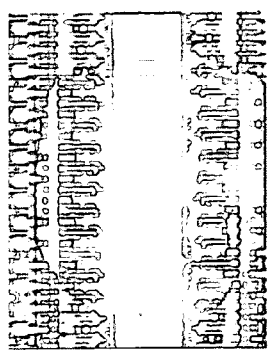

ENVIRONMENTALLY FRIENDLY ADDITIVES FOR INKJET INKS

FIELD OF THE INVENTION

The present invention generally relates to inkjet printing, and in particular, to inks suitable for use on a range of media and exhibiting enhanced performance, particularly puddling control.

BACKGROUND OF THE INVENTION

Printing liquids are used in many applications such as painting, gravure and press printing, xerographic printing using liquid toners, and inkjet printing. Printing liquids typically comprise a colorant in a liquid medium or vehicle. Examples include paints, liquid toners, and inks. The vehicle may be organic-based (solvent-based) or water-based (aqueous-based). The colorant may be dye or pigment, or a combination thereof. The printing liquid may further include additional ingredients based on the particular application.

Inkjet printing is a non-impact printing process in which droplets of ink are deposited on print medium, such as paper, transparency film, or textiles. Essentially, inkjet printing involves the ejection of fine droplets of ink onto print medium in response to electrical signals generated by a microprocessor. Inkjet printers offer low cost, high quality printing with relatively noise-free operation. As such, inkjet printers have become a popular alternative to other types of printers.

There are two basic means currently available for achieving ink droplet ejection in inkjet printing: thermally and piezoelectrically. In piezoelectric inkjet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

A conventional thermal color inkjet printer comprises a plurality of resistor elements arranged in a particular pattern in a printhead. The resistor elements are located in a chamber that is provided with an opening for inkjet ink to enter from a reservoir. Together, the printhead and the reservoir, comprise an inkjet pen. The printhead also includes an orifice plate having a plurality of orifices through which inkjet ink is expelled toward a print medium. Each resistor element is connected by a conductive trace to a microprocessor, where current-carrying signals cause one or more selected resistor elements to heat up. The heat creates bubbles of vaporized ink in the chambers, which force the ink to expel through the orifices toward the print medium. The properly sequenced ejection of inkjet ink from each orifice causes characters or other images to be printed on the print medium as the printhead is moved across the print medium. The inkjet printers produce high quality printing and are both compact and affordable. In addition, since only the ink strikes the paper, the inkjet printer is fast and quiet.

To produce high quality images, the inkjet ink must be compatible with the inkjet pen and the print medium, as well as the rest of the printing system. The properties of an optimal inkjet ink include, among other things, good crusting resistance, good stability, low color-to-color and black-to-color bleed, and rapid dry time. In addition, the inkjet ink must be capable of passing through the inkjet orifice without clogging the orifice or puddling on the orifice plate. The inkjet ink should also permit rapid cleanup of the machine components with minimal effort while being environmentally friendly.

While the overall print quality of currently produced inkjet inks is generally high, puddling of these inks may still occur on the orifice plate of the printhead. Puddling occurs when the ink that is ejected through the orifices does not reach the print medium. Instead, the inkjet ink collects on an outer surface of the orifice plate or puddles adjacent to the edge of the orifice. The extent of the puddling varies from a few small drops of ink to the formation of large puddles on large portions of the orifice plate. Large puddles partially or completely block the orifices and cause missing nozzles, false low decap values, or changes in the trajectory of the ink drops. The change in trajectory results in the ink drop not hitting its targeted pixel center, which creates printing errors on the media and reduces the quality of the printed image.

Various solutions to address the problem of puddling have been proposed. Some solutions propose modifying the printhead or pen to reduce puddling, while other solutions modify the inkjet ink composition. For example, some approaches include the coating of hydrophobic material applied to the printhead to reduce its wettability and, thereby, reduce puddling; combination of pen architecture and inks; and modifications to the inkjet ink composition.

Other proposed modifications to the inkjet inks include adding anionic and nonionic surfactants to the inkjet ink. One example of surfactants used in inkjet inks are fluorinated compounds which may be nonionic, anionic, cationic, or amphoteric. Examples of such fluorinated compounds include those commercially available from E. I. du Pont de Nemours and Company (Wilmington, Del.) as Zonyl®, and from 3M Company (Minneapolis, Minn.) as Fluorad®. These surfactants are commonly classified as telomer which refers to a mixture of perfluorinated oligomers of carbon chain length from C6 to C18 possessing a reactive functional group.

It would be desirable to reduce puddling of inkjet inks by using additives that are effective in low amounts and do not negatively affect other properties of the inkjet inks. In addition, it would be desirable to use additives that are effective in many types of ink vehicles.

SUMMARY OF THE INVENTION

The present invention is directed to ink compositions and printed substrates produced using the ink, inkjet pens including the ink, printing systems for using and printing with the ink, and methods for using the same. In an embodiment, the ink composition is an inkjet ink made by combining a colorant; an inkjet vehicle; and an additive formed from at least a polymeric material having at least one polar group and having at least one pendant group comprising an $R_f$ group, the polymeric material having at least 2 repeat units. In this embodiment each at least one polar group is independently selected from a group consisting of an anion-countercation; a cation-counteranion; an amphoteric group, and a non-ionic group. Furthermore, in this embodiment each $R_f$ group is independently selected from a group consisting of a fluorinated linear alkyl having from 1 to about 7 carbon atoms; and a fluorinated branched alkyl wherein the longest chain is from 1 to about 7 carbon atoms and each branch independently contains from 1 to about 3 carbon atoms. In addition, each $R_f$, whether linear or branched, has at least one carbon atom bonded to at least one fluorine atom. Finally, each $R_f$ group independently has at least 10% of the non-carbon atoms being fluorine atoms and the remaining non-carbon atoms being independently selected from the group consisting of: H, I, Cl, and Br.

BRIEF DESCRIPTION OF THE DRAWINGS

FIGS. 1A through 6C are top view photographic representations of inkjet printheads with different inks and puddling performance, all embodying features of the invention.

DETAILED DESCRIPTION OF EMBODIMENTS OF THE INVENTION

Inks

Figure 4C:
Figure 4B:
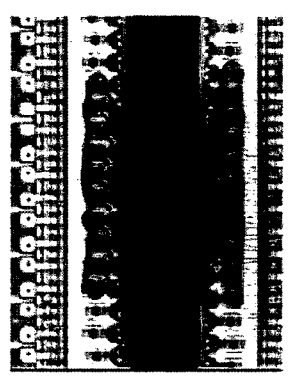
Figure 4A:
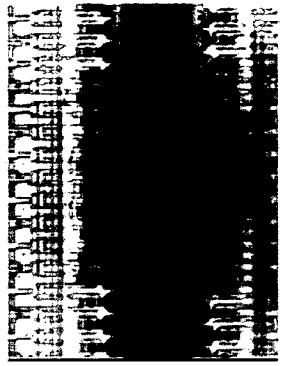

An inkjet ink of the present invention may comprise at least one colorant, such as dyes or pigments, or a combination thereof, an ink vehicle, and an additive based on oxetane chemistry. In one embodiment, the additive is an environmentally friendly additive ("EFA"). In one embodiment the EFA is particularly configured to aid in controlling and minimizing puddling of ink on an orifice plate of a printhead of an inkjet pen. Without intending to limit the scope of the invention, this additive will be referred to as the "the environmentally friendly additive" or "EFA" for short.

In an embodiment, the ("EFA") is a polymer based on oxetane (4-membered cyclic ethers) chemistry with short fluorinated side chains, stable ether linkages and reactive end group functionality, with fluoroalkyl groups varying from $CF_3$ to $C_4F_9$.

In one embodiment, the EFA includes a polymeric material derived from a cyclic ether monomer having a total of 2 to 6, usually 5, normally 3, carbon atoms in the ring with a total of about 1 to about 20 substituted carbon atoms, or dioxane, dioxalane, or trioxane. In an embodiment, the polymer has at least one polar group and having at least one pendant group comprising an $R_f$-group, the polymeric material has at least 2 repeat units. Each of the at least one polar group, independently, is an anion-countercation; a cation-counteranion; an amphoteric group; or a non-ionic group. Each $R_f$-group, independently, may be a fluorinated linear alkyl having from 1 to about 7 carbon atoms; or a fluorinated branched alkyl wherein the longest chain is from 1 to about 7 carbon atoms and each branch, independently, containing from 1 to about 3 carbon atoms; and each $R_f$, whether linear or branched, has at least one carbon atom bonded to at least one fluorine atom.

Generally, and independently, each of the linear alky or the main chain of the branched alkyl, ranges from about 1 to less than 6 carbon atoms, typically 2, 3, or 4 carbon atoms. In an embodiment the $R_f$-group is a linear alkyl.

In various embodiments, each $R_f$-group, independently, has at least about 95%, at least about 90%, at least about 85%, at least about 80%, at least about 50% to about 75%, at least 25%, at least about 10 to about 25%; of the non-carbon atoms being fluorine atoms. In an embodiment the remaining non-carbon atoms are independently selectable from the group consisting of are H, I, Cl, and Br.

In an embodiment the $R_f$ group is fully saturated with fluorine atoms. In an embodiment, when the $R_f$-group is fully saturated with fluorine atoms, it has a formula $R_f=C_nF_{2n+1}$.

Generally, the average degree of polymerization for the polymers useful in the practice of the present invention, is at least about 2 to about 200, generally from at least about 2 to about 100, typically from at least about 2 to about 30, often from at least about 2 to about 20; usually from at least about 2 to about 10, normally less than about 10 to about 15.

The above-referenced polymeric material and their method of making is described in U.S. Pat. No. 6,660,828 B2, the full disclosure of which is incorporated herein by reference (for a general description please refer to column 3 line 20 through column 7, line 55. Preparation of monomers and polymers is shown in Example M1-M3, P1 and CP ending in column 11, line 15).

In an embodiment, the polymeric compounds, useful in the practice of the invention may have at least one of the following formulae. The inks of the present invention, may comprise any one of the polymers described herein or a combination thereof.

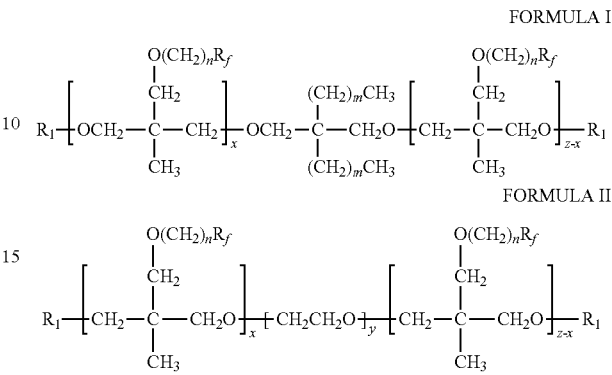

In an embodiment, in each of Formulae I and II, independently, value of subscript n ranges from about 1 to about 5, typically from about 1 to about 4, normally about 1.

In an embodiment, in each of Formulae I and II, independently, value of subscript m ranges from about 0 to 5, usually from about 0 to 4, typically from about 0 to 1, normally 0.

In an embodiment, in Formula II, the value of subscript y generally ranges from about 0 to about 40, from about 15 to about 35, typically from about 15 to about 25, normally about 20.

In an embodiment, the polymer in center portion of Formula II having subscript y associated therewith is derived from ethylene oxide. Other monomers such as propylene oxide and butylene oxide may be utilized in the practice of the invention.

In an embodiment the total of (x+(z−x)) in Formula I generally ranges from about 2 to about 30, typically from about 2 to about 12, normally from about 7 to about 10. In an embodiment in Formula II, the total of (x+y+(z−x)) ranges from about 25 to 45. In an embodiment, in Formula II, x ranges from 0 to 8.

$R_1$, polar groups, may be independently selected to be anionic, cationic, or nonionic; and can be independently selected from the following, but not limited to:

(a) An anionic group such as carboxylate, sulfonate, sulfate, phosphate, or nitrate. The typical cationic counter-ion include sodium, lithium, potassium, cesium, quaternary ammonium ions or ammonium ions of the general formula $NH_{4-x}R_x^{30}$ where R is typically a hydrocarbon radical having from about 1 to about 18 carbon atoms and x is 0 to about 3.

(b) A cationic group consisting of ammonium, $-NH_{3-x}R_x^+$, where x is from 0 to about 3, a quaternary ammonium group, or a phosphonium group, $-PH_{3-x}R_x^+$, where x is 0 to about 3. Anionic counter-ions include fluoride, chloride, bromide, iodide and tetrafluoroborate.

(c) Nonionic moieties including various poly ethers such as poly(ethylene oxide), poly(propylene oxide), poly(butylenes oxide), various polyether copolymers, carbonyl, carboxyl, nitrile, thiol, cyano, amido, and hydroxyl.

Such polymers are commercially available from companies such as Omnova Solutions, Inc. of Fairlawn, Ohio under the trade name of PolyFox™, as shown in Formulae III, IV, and V and their respective trade names, below:

FORMULA III

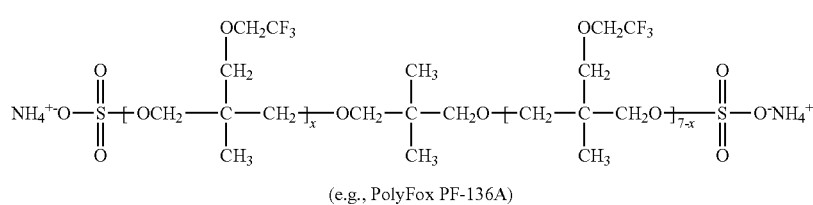

(e.g., PolyFox PF-136A)

Wherein x ranges from 0 to 7.

FORMULA IV

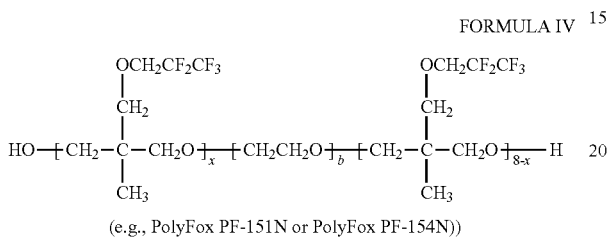

(e.g., PolyFox PF-151N or PolyFox PF-154N))

Wherein x is ranges from 0 to 8; and b is either about 20 (PolyFox PF-151N) or about 33 (PolyFox PF-154N).

FORMULA V

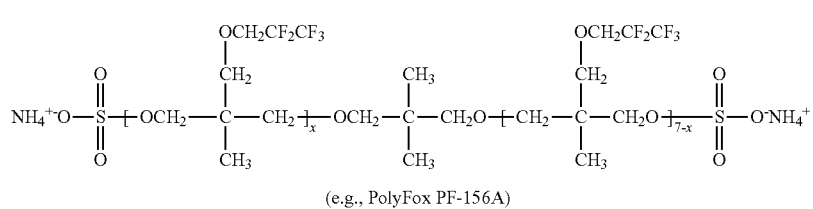

(e.g., PolyFox PF-156A)

Wherein x ranges from 0 to 7.

FORMULA VI

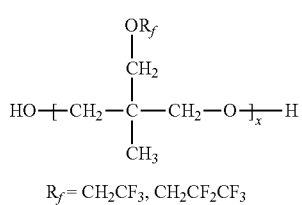

$R_f = CH_2CF_3, CH_2CF_2CF_3$

Wherein the length of the pendant perfluoroalkyl group is selected from the group consisting of $C_4F_9$ or shorter including $CF_3$, $C_2F_5$, $C_3F_7$ and $C_4F_9$.

The EFA may be present in the inkjet ink in an amount effective to provide the desired effect and may be soluble in the inkjet ink in the amount used. In an embodiment the desired effect is to either or both control and minimize puddling. The amount of EFA present in the inkjet ink may be an amount sufficient to provide the desired effect without negatively impacting other properties of the inkjet inks. The EFA may generally be added to the ink in an amount ranging from about 0.0005 wt. % to about 3.0 wt. % of the total weight of the inkjet ink, usually from about 0.0005 to about 2.0 wt %, normally from about 0.01 wt % to about 1.0 wt %, typically from about 0.05 wt % to about 1.0 wt % (with the wt. % numbers for the EFA corrected for the % solids). Since the EFA does not negatively affect other properties of the inkjet inks, the EFA may be used over a wide variety of ink vehicles. In addition, more than one EFA, of the same general formula or a different one, may be used in the inkjet ink to achieve the desired effect, e.g., control or minimizing of puddling. It should be noted that the presence of the EFA is not mutually exclusive of other compounds that may affect puddling (positively or negatively) performance of the ink.

Colorant

The colorant may be a dye, a pigment, or a combination of both. More than one dye or pigment may be used in any ink formulation.

If the colorant is a dye, the dye may be nonionic, cationic, anionic, or a mixture of nonionic, cationic, and/or anionic dyes. Dyes are well known in the art and are commercially available from numerous sources including, but not limited to, Avecia (Wilmington, Del.), Mitsubishi Chemical Corp. (Tokyo, Japan), and Ilford AG (Fribourg, Switzerland). The dyes included may be Acid dyes, Direct dyes, Food dyes, Mordant dyes, or Reactive dyes and may be water-soluble or water-insoluble. Examples of dyes include, but are not limited to, sulfonate and carboxylate dyes, such as those dyes that are commonly employed in inkjet printing. Specific examples of dyes that may be used in the inkjet ink include, but are not limited to, Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Acid Yellow 23, Acid Blue 9, Nitro Blue Tetrazolium Chloride Monohydrate or Nitro BT, Rhodamine 6G, Rhodamine 123, Rhodamine B, Rhodamine B Isosyanate, Safranine O, Azure B, and Azure B Eosinate, all of which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow. The dye is not critical to the operability of the present invention and, therefore, the selection of dye is not discussed in detail.

Rather, it is understood that one of ordinary skill in the art could select any suitable dye for use in the present invention.

In addition to color dyes or pigments, black dyes or pigments may be used in the inkjet ink. For example, Direct Black 154, Direct Black 168, Fast Black 2, Direct Black 171, Direct Black 31, Direct Black 19, Acid Black 1, Acid Black 191, Mobay Black SP, or Acid Black 2 may be used.

The dye, when present in the ink alone or in combination with the pigment, may be added to the ink in an amount ranging from about 0.05 to about 20%, by weight, generally, from about 0.1 to about 8%, by weight, and typically, from about 1 to about 7%, and normally from about 0.5 to about 5%, by weight, based on the total weight of the ink.

As used herein, the term "pigment" refers to a colorant that is insoluble in the aqueous vehicle, and includes disperse dyes. A wide variety of organic and inorganic pigments, alone or in combination, may be selected to make the ink, examples of which are disclosed in U.S. Pat. No. 5,085,698. The pigment particles are sufficiently small to permit free flow of the ink through the inkjet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is approximately 0.005 micron to 15 micron. Preferably, the pigment particle size should range from 0.005 to 5 micron and, next preferably, from 0.010 to 1 micron, and most preferably, from about 0.010 to 0.3 micron. The pigment, when present in the ink alone or in combination with the dye, may be added to the ink in an amount ranging from about 0.1 to about 20%, by weight, generally, from about 0.5 to about 15%, by weight, and typically, from about 0.5 to about 8%, by weight, based on the total weight of the ink.

Aqueous Vehicle

The ink vehicle may comprise an aqueous-based ink vehicle that includes water or a mixture of water and at least one water-soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698, the full disclosure of which is incorporated herein by reference.

More specifically, the water-soluble organic solvent may include, but is not limited to, aliphatic alcohols, aromatic alcohols, diols, glycol ethers, poly(glycol) ethers, caprolactams, formamides, acetamides, and long chain alcohols, or any mixtures thereof. Examples of organic solvents employed in the practice of this invention include, but are not limited to, primary alcohols of 30 carbons or less, primary aromatic alcohols of 30 carbons or less, secondary aliphatic alcohols of 30 carbons or less, secondary aliphatic alcohols of 30 carbons or less, 1,3-alkyldiols of 30 carbons or less, alkyltriols of 30 carbons or less, 1,3-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific organic solvents that are preferably employed in the practice of this invention include, but are not limited to, N-methyl pyrrolidone, 1,5-pentanediol, 2-pyrrolidone, 1-(2-hydroxyethyl)-2-pyrrolidone, diethylene glycol, 1,3-(2-methyl)-propanediol, 1,3,5-(2-methyl)-pentanetriol, tetramethylene sulfone, 3-methyl-3-methylbutanol, glycerol, 3-pyridylcarbinol, pentaerythritol, 1,6-hexanediol, 1,2-alkyldiols, and mixtures thereof. For instance, the water-soluble organic solvent in the ink vehicle may include a mixture of a diol, a polyglycol ether, and a glycol ether.

In the case of a mixture of water and at least one water-soluble solvent, the aqueous carrier medium usually comprises from about 30% to about 95% water. Generally the compositions may comprise from about 60% to about 95% water, based on the total weight of the aqueous carrier medium. The water-soluble organic solvent(s), independently, may generally be added to the ink in an amount ranging from about 0.01 wt % to about 50 wt % of the total weight of the inkjet ink; usually from about 0.1 to about 25 wt %, normally from about 1 to about 25 wt %.

Additional Components

Consistent with this invention, various types of additives, as is commonly practiced in the art, may be employed in the inks to optimize the properties of the ink compositions for specific applications. The remainder of the ink compositions are mostly water; however, other independently selected components including surfactants, humectants, buffers, preservatives, biocides that inhibit growth of microorganisms such as the preservative PROXEL™ GXL (available from Avecia Incorporated); chelating agents (or sequestering agents) such as EDTA that eliminate deleterious effects of heavy metal impurities; buffers; and viscosity modifiers, may be added to improve various properties of the ink composition.

In an embodiment, at least one other type of surfactant (other than the at least one EFA) may be used in the ink vehicle. The other type of surfactant may be a nonionic, amphoteric, or ionic. Examples of nonionic and amphoteric surfactants include TERGITOL® compounds, which are alkyl polyethylene oxides available from Dow Chemical (Midland, Mich.); TRITON® compounds, which are alkyl phenyl polyethylene oxide surfactants available from Rohm & Haas Co. (Philadelphia, Pa.); BRIJ® compounds available from ICI Americas (Wilmington, Del.); PLURONIC® compounds, which are polyethylene oxide/polypropylene oxide block copolymers; SURFYNOL® compounds, which are acetylenic polyethylene oxides available from Air Products (Allentown, Pa.); anionic surfactants such as members of the DOWFAX™ family of diphenyl sulfonate derivatives available from the Dow Chemical Company, and the CRODAFOS™ family of phosphate esters of ethoxylated oleoalcohol available from Croda Incorporated; polyethylene oxide ("POE") esters; POE diesters; POE amines; POE amides; and dimethicone copolyols.

The other surfactant employed in the present invention may be added in an amount generally ranging from 0 wt. % to about 40 wt. % of the total weight of the inkjet ink, normally from 0 wt. % to about 5 wt. %. In one embodiment, the other surfactant may include at least one fluorosurfactant (other than the EFA). In one embodiment at least one telomer surfactant such as those mentioned earlier (e.g., Zonyl) may also be used. In an embodiment, using Zonyl type surfactants, the Zonyl is added in an amount ranging up to about 3%, normally less than about 1% by weight.

Buffers may be used to maintain the inkjet ink at a desired pH. The buffer may be an organic-based biological buffer or an inorganic buffer. The buffers employed may provide a pH ranging from approximately 3 to approximately 9, preferably from approximately 6 to approximately 9, and most preferably from approximately 8 to approximately 8.5. Examples of buffers include Trizma Base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO").

EXAMPLES

The general composition of exemplary inkjet inks made according to the present invention is shown in TABLE I, along with exemplary ranges of amount of ingredients making up each component. The inkjet ink may be cyan, magenta, yellow, or black, depending on the colorant that is used. Each ink may include one or more colorant at independently selectable concentrations, hues, values, and chromas. The pH of the inks were adjusted, as necessary with either NaOH or $HNO_3$.

TABLE I

| Ingredient | Amount added to make the wt. % |
|---|---|
| Colorant | about 0.2 to about 7; |
| | about 0.7 to about 7; |
| | about 1 to about 7 |
| Water soluble organic solvent | about 5 to about 75; |
| | about 1 to about 55; |
| | about 1 to about 25 |
| Buffer | about 0 to about 0.5; |
| | about 0 to about 0.2; |
| | about 0 to about 0.1 |
| Preservative/biocide | about 0.05 to about 0.5; |
| | about 0.05 to about 0.35; |
| | about 0.05 to about 0.2 |
| Non-Fluoro Surfactant | about 0 to about 4; |
| | about 0 to about 3; |
| | about 0 to about 2 |
| EFA | about 0.0005 to about 3 |
| | about 0.0005 to about 2; |
| | about 0.05 to about 1 |
| Sequestering Agent | about 0 to about 1; |
| | about 0.002 to about 0.5; |
| | about 0.002 to about 0.3 |
| Other Optional Fluoro-surfactants | about 0 to about 3; |
| | about 0 to about 2; |
| | about 0 to about 1 |
| Water | Substantially the remainder |

Inks were formulated and different performance attributes of the formulated inks were observed or measured in an effort to assess the benefits attained in the practice of the invention, such as, the effect of EFA on puddling, in particular in the absence of telomer surfactants, while maintaining the other print and pen attributes. The summary of composition of the inks made is represented in Table II.

TABLE II

| Ink ID*[1] | Wt. % of all added ingredients*[2] | PF-136A (Wt. %)*[3] | PF-156A (Wt. %)*[3] | PF-151N (Wt. %)*[3] | Zonyl FSN (color inks) or FSO (black or gray inks)*[3] |
|---|---|---|---|---|---|
| DP1016C | 100.00 | | | | |
| DP1026M | 100.00 | | | | |
| DP1027Y | 100.00 | | | | |
| DP1018C | 99.88 | 0.12 | | | |
| DP1028M | 99.88 | 0.12 | | | |
| DP1029Y | 99.88 | 0.12 | | | |
| DP1019C | 99.88 | | 0.12 | | |
| DP1030M | 99.88 | | 0.12 | | |
| DP1031Y | 99.88 | | 0.12 | | |
| DP1020C | 99.50 | | | 0.50 | |
| DP1032M | 99.50 | | | 0.50 | |
| DP1033Y | 99.50 | | | 0.50 | |
| GPR5C | 99.80 | | | | 0.20 |
| GPR5M | 99.80 | | | | 0.20 |
| GPR5Y | 99.80 | | | | 0.20 |
| DP1035Kp | 100.00 | | | | |
| DP1036Kp | 99.976 | 0.0024 | | | |
| DP1037Kp | 99.976 | | 0.0024 | | |
| DP1038Kp | 99.9905 | | | 0.0095 | |
| DP1039Kp | 99.996 | | | | 0.004 |
| GPR51Kp | 99.996 | | | | 0.004 |
| DP1048Kd | 99.88 | 0.12 | | | |
| DP1049Kd | 99.88 | | 0.12 | | |
| DP1050Kd | 99.50 | | | 0.50 | |
| DP1051Kd | 99.80 | | | | 0.20 |
| DP1052G | 99.88 | 0.12 | | | |
| DP1053G | 99.88 | | 0.12 | | |
| DP1054G | 99.50 | | | 0.50 | |
| DP1055G | 99.80 | | | | 0.20 |

Note:
*[1]The last letter/s in each ink id refers to its color: C, M, Y, Kp, Kd and G; representing dye cyan, dye magenta, dye yellow, pigment black, dye black and dye gray, respectively.

Note:
*[2]including vehicle, buffer, and colorant (no Fluoro-surfactant).

Note:
*[3]Adjusted for % solids.

Figure 5C:
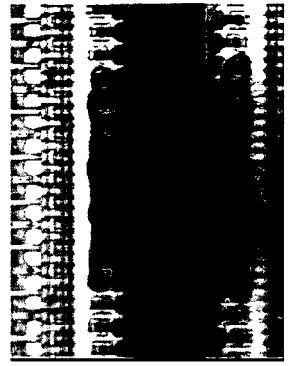
Figure 5B:
Figure 5A:
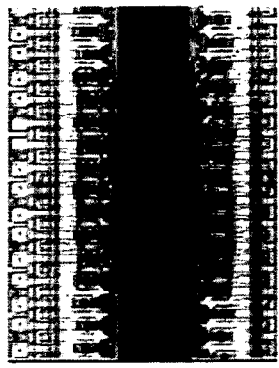
Figure 6C:
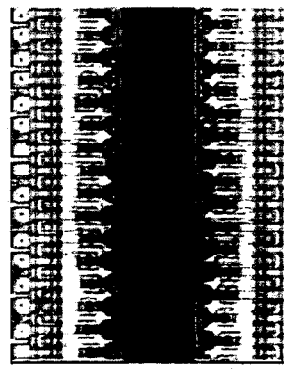
Figure 6B:
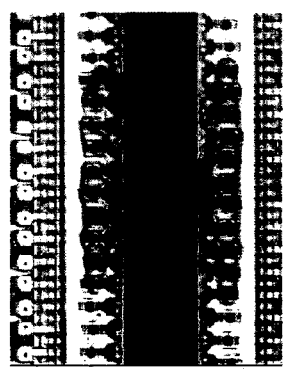
Figure 6A:
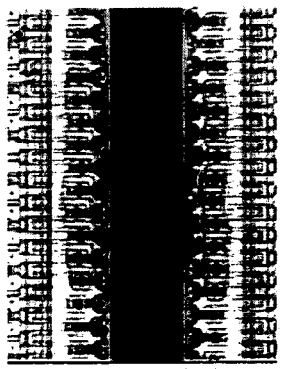

PUDDLING. The puddling performance of the various ink samples was evaluated using a visual scale. To evaluate puddling, Cyan inks from Table II (namely, DP1016C, DP1018C, DP1019C, DP1020C, and GPR5C), as representative inks, were loaded into inkjet pens and examined with a high-speed video camera system synchronized with the drop ejection frequency, at firing frequencies of 3, 6 and 12 kHz according to Table III (which describes the ink/frequency combinations corresponding to FIGS. 1A through 6C). The worst puddling was seen at the lowest frequency for the ink with no fluoro-surfactants (DP1016C). As can be seen from the photos of puddling shown in FIGS. 1A through 6C, generally, all of the PolyFox surfactants (EFA) controlled puddling as well as or better than Zonyl FSN (sample GPR5C). Surprisingly, it was also noted that when the pens were turned off, any ink that was in the process of or about to spread during firing was pulled back into the nozzles of the pens comprising inks with Poly-Fox surfactants. This characteristic aids in general orifice plate cleanliness. For the purposes of ease of comparison among the various sheets of drawings, FIGS. 2A through 2C which represent the GPR5C sample, have been repeated as FIGS. 5A-5C.

TABLE III

| Ink ID | Frequency at 3 kHz Figure ID | Frequency at 6 kHz Figure ID | Frequency at 12 kHz Figure ID |
|---|---|---|---|
| DP1016C | 1A | 1B | 1C |
| GPR5C | 2A | 2B | 2C |
| DP1018C | 3A | 3B | 3C |
| DP1019C | 4A | 4B | 4C |
| GPR5C | 5A | 5B | 5C |
| DP1020C | 6A | 6B | 6C |

A range of print quality and color attributes were measured using the following pen/ink configuration, as shown in TABLE IV, where the groups included the fluorosurfactants as shown in Table V, using a subset of the inks shown in Table II above:

TABLE IV

| Pen/Ink Group ID | Black Ink ID | Yellow Ink ID | Magenta Ink ID | Cyan Ink ID |
|---|---|---|---|---|
| Group 1 | DP1035Kp | DP1027Y | DP1026M | DP1016C |
| Group 2 | DP1036Kp | DP1029Y | DP1028M | DP1018C |
| Group 3 | DP1037Kp | DP1031Y | DP1030M | DP1019C |
| Group 4 | DP1038Kp | DP1033Y | DP1032M | DP1020C |
| Group 5 | DP1039Kp | DP1027Y | DP1026M | DP1016C |
| Group 6 | GPR51Kp | GPR5Y | GPR5M | GPR5C |

TABLE V

| Pen/Ink Group ID | Fluoro-surfactant ID |
|---|---|
| Group 1 | No KCMY Fluorosurfactants |
| Group 2 | PolyFox PF-136A in KCMY |
| Group 3 | PolyFox PF-156A in KCMY |
| Group 4 | PolyFox PF-151N in KCMY |
| Group 5 | No CMY Fluorosurfactants, Zonyl FSO in K |
| Group 6 | Control - Zonyl FSO in K, Zonyl FSN in CMY |

The inks in Groups 1-6 were printed at 30 inches per second (ips) using an inkjet printer on a range of plain and special media. The samples were either or both evaluated using human observation and machine readable techniques. The following summarizes the results:

Black-to-color bleed. In general, the black-to-color bleed and wicking was minimal, if present at all, for all ink group combinations, with the relatively worst performance being exhibited by Group 6 (although the performance was still acceptable).

Halo. Halo was evaluated using a visual scale. Halo is generally referred to as the white or weakly colored region formed at the interface of the black and colored inks. In some instances, one or more of the color inks may invade the pigment black area when printed adjacent to each other causing a loss of optical density and image quality along the black interface and is referred to as halo. In general, the average halo results were similar and acceptable among the ink Groups, with the anionic PolyFox EFA showing relatively the best halo performance.

Mottle and Coalescence. Mottling and coalescence were evaluated using a visual scale. Mottling generally refers to non-uniformity of printed area which follows patterns in a plain paper or by non-uniform ink-paper and ink-ink interaction, which can lead to non-uniformity of the image density. The combination of one or more drops into a single larger unit that results in uneven print density (or ink density) on special/glossy media is referred to as coalescence. The results generally indicated similarly acceptable mottle and coalescence performance.

Chroma, Hue, L*, and Saturation. The color performance attributes of chroma (C*), color hue, L* (lightness) and saturation (C*/L*), were evaluated using 100% density-generated squares. The results indicated that none of the EFA surfactants had any negative effects on these color parameters.

Ink Stability and Decap. In yet another set of experiments, the dye black and dye gray inks were evaluated for ink stability (accelerated testing), black-color bleed, neutrality, and flying decap, using a subset of inks in Table II above, using the pen/ink configuration shown in Table VI, below. Print samples were generated similar to above on a range of plain and special media. The samples were either or both evaluated using human observation and machine readable techniques. The following summarizes the results:

TABLE VI

| Pen/Ink Group ID | Black Ink ID | Yellow Ink ID | Magenta Ink ID | Cyan Ink ID |
|---|---|---|---|---|
| Group 7 | DP1048Kd | GPR5Y | GPR5M | GPR5C |
| Group 8 | DP1049Kd | GPR5Y | GPR5M | GPR5C |
| Group 9 | DP1050Kd | GPR5Y | GPR5M | GPR5C |
| Group 10 | DP1051Kd | GPR5Y | GPR5M | GPR5C |
| Group 11 | DP1052G | GPR5Y | GPR5M | GPR5C |
| Group 12 | DP1053G | GPR5Y | GPR5M | GPR5C |
| Group 13 | DP1054G | GPR5Y | GPR5M | GPR5C |
| Group 14 | DP1055G | GPR5Y | GPR5M | GPR5C |

TABLE VII

| Pen/Ink GroupID | Fluoro-surfactant ID |
|---|---|
| Group 7 | PolyFox PF-136A in DP1048Kp |
| Group 8 | PolyFox PF-156A in DP1049Kp |
| Group 9 | PolyFox PF-151N in DP1050Kp |
| Group 10 | Control - Zonyl FSO in DP1051Kp |
| Group 11 | PolyFox PF-136A in DP1052G |
| Group 12 | PolyFox PF-156A in DP1053G |
| Group 13 | PolyFox PF-151N in DP1054G |
| Group 14 | Control - Zonyl FSO in DP1055G |

Accelerated Stability Test. The inks were run through a standard six week, 60° C. ASL test and were monitored every two weeks for viscosity, conductivity, pH, surface tension and solution absorption spectra. The results generally indicated similarly acceptable stability performance.

Flying Decap. Flying decap time is defined as the amount of time that a nozzle can fly back and forth in a carriage uncapped and without printing and still produce a good, strong, straight first drop of ink. Flying decap was tested at 6 and 11 seconds and the results of all the PolyFox fluorosurfactants examined were similar to when Zonyl FSN is used.

Color/Neutrality. The inks were used to generate a digital black and white photograph and a black/gray ramp. The L*a*b* and black optical density were measured. Both the L*a*b* color space measurements and human visual opinions generally indicated similar results between inks containing PolyFox fluorosurfactants and Zonyl FSN.

Black-Color Bleed. Black-to-color bleed was evaluated using the black and gray inks in Table V and VI, for all primary and secondary colors. The results generally indicated similar results between inks containing PolyFox fluorosurfactants and Zonyl FSN.

Paper Axis Drop Trajectory. Cyan inks from Table II (namely, DP1016C, DP1018C, DP1019C, DP1020C, and GPR5C), as representative inks, were loaded into inkjet pens and Paper Axis Drop ("PAD") Trajectory performance of the inks was evaluated using a diagnostic plot printed at 1.2 mm pen-to-paper spacing, over a range of frequencies using a horizontal line spacing as a metric. A regular selection of nozzles was fired giving regularly spaced horizontal lines at a spacing of 292 micron (μm) on center. Any deviation from the regular spacing shows a trajectory error often associated with puddling. The inks were placed in a fluidic architecture intended to puddle and induce drop trajectory errors to see if inks having the surfactant additives could control the puddling more than the control case with no surfactant. The standard deviation of the line spacing was compared as a measure of line spacing regularity print quality. A number of printheads per ink were tested and results are summarized in Table VIII. As can be seen from the data, DP1016C with no surfactant showed the worst relative performance, while generally similar results were obtained for inks containing the EFA according to the present invention, in particular, DP1019C; and ink with Zonyl FSN (GPR5C).

TABLE VIII

| | Standard Deviation of Horizontal Line Spacing (micron) | | |
|---|---|---|---|
| Ink ID | Frequency at 6 kHz | Frequency at 12 kHz | Frequency at 24 kHz |
| DP1016C | 3.71 | 10.15 | 33.03 |
| DP1018C | 2.65 | 7.10 | 22.70 |
| DP1019C | 2.34 | 6.95 | 19.34 |
| DP1020C | 2.81 | 11.08 | 30.29 |
| GPR5C | 1.94 | 4.14 | 19.07 |

Scan Axis Drop Trajectory. Cyan inks from Table II (namely, DP1016C, DP1018C, DP1019C, DP1020C, and GPR5C), as representative inks, were loaded into inkjet pens and Scan Axis Drop ("SAD") Trajectory performance of the inks was evaluated using a diagnostic plot. The desirable mean SAD separation (MSS) should be 0 degree, indicating that both nozzle columns are ejecting the ink drops at a trajectory which is normal to the nozzle plate of the printhead. Any systematic puddling can cause misdirection, resulting in a nozzle toe-in or toe-out error. A number of printheads per ink were tested and the results are summarized in Table IX. As can be seen from the data, DP1016C with no surfactant showed the worst relative performance, while generally similar results were obtained for inks containing the EFA according to the present invention, in particular, DP1019C; and ink with Zonyl FSN (GPR5C).

TABLE IX

| | Mean SAD Separation (degrees) | |
|---|---|---|
| Ink ID | MSS mean | MSS st. dev. |
| DP1016C | 0.25 | 0.23 |
| DP1018C | 0.13 | 0.17 |
| DP1019C | 0.01 | 0.07 |
| DP1020C | 0.10 | 0.16 |
| GPR5C | 0.00 | 0.13 |

Method of Formulating the Inks

To formulate the inks according to the present invention, the various ingredients were provided. By way of example, the solvents (including water, organic, and other inorganic solvents); the one or more colorant (e.g., dye, pigment, or combination thereof), the EFA, and any of the other ingredients mentioned above were provided. The ingredients may be provided in any order and are mixed with one another in one or more steps. The order of mixing of the ingredients may be in any order as may be necessary to provide the most suitable mixture or solution for its intended purpose. The ink may be made available in concentrate forms or in final concentration for use with an inkjet pen.

Exemplary Method of Formulating the Inks

The dye based color, black and gray inks were prepared by combining the deionized water, cosolvents and surfactants, including the EFA(s) or other fluoro surfactants, and mixing until homogeneous. Next, the pH buffer, sequestering agent (i.e. EDTA) and biocide were added and the pH was adjusted with nitric acid or sodium hydroxide (or other suitable acid or base) to near the pH of maximum buffering capacity. The dyes were then added and the pH was adjusted to the desired value.

Pigment black inks were prepared by combining the water, cosolvents, surfactants, including the EFA(s) or other fluoro surfactants, buffer and biocide. A pre-dissolved binder, such as SMA, was added and mixed until homogeneous. Depending on the system and whichever formed a more stable ink, either the vehicle was slowly added to the pigment dispersion or the pigment dispersion was slowly added to the vehicle and the final pH adjustment was made. The decision of when and what value of pH to assign the vehicle and whether to adjust with acid or base depended entirely on the specific pigment ink system.

Figure 7:
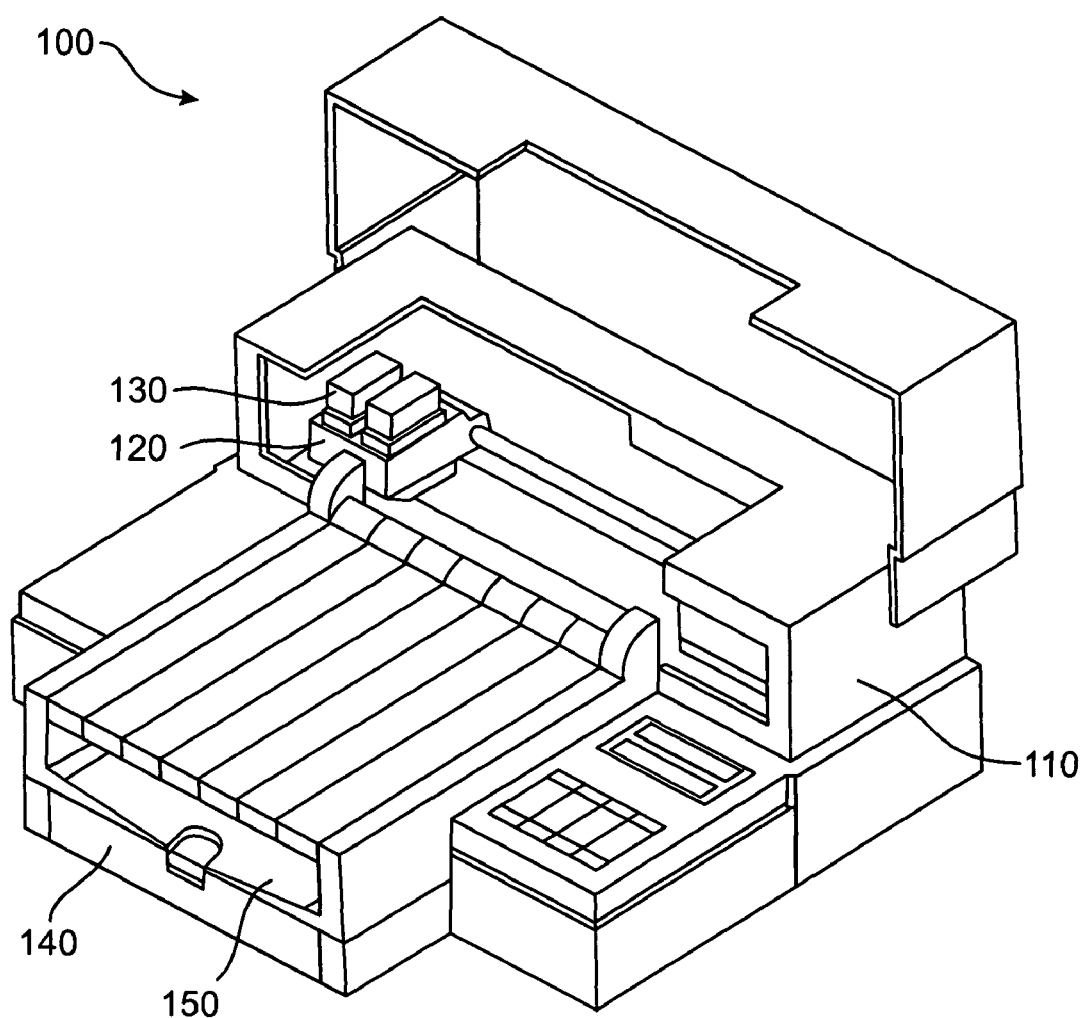
FIG. 7 is an illustration of a print system utilizing inks embodying features of the invention.

The formulated ink according to the present invention, may be configured for use with an inkjet pen (the pen as referred to herein may be on-axis or off-axis—meaning that the ink supply portion of the pen may be attached (permanently or removably attached) to the printhead and placeable on the chassis that moves the pen across the printing medium; or off-axis where the ink supply portion of the pen is somewhere remote to the printhead and does not move with the printhead on the chassis across the printing medium. An exemplary printing system 100 embodying features of the invention is illustrated in FIG. 7, having a printer 110, an inkjet pen 120. In the embodiment shown, the pen 120 is an on-axis printer with an ink supply portion 130 containing the ink (not shown). The printing system 100, as shown includes a media tray 140 and media 150. As can be appreciated, the ink supply, as described earlier, may be off-axis. The printing system 100 may be used to print any number and type of media to produce printed substrates.

While particular forms of the invention have been illustrated and described herein, it will be apparent that various modifications and improvements can be made to the invention. Moreover, individual features of embodiments of the invention may be shown in some drawings and not in others, but those skilled in the art will recognize that individual features of one embodiment of the invention can be combined with any or all the features of another embodiment. Accordingly, it is not intended that the invention be limited to the specific embodiments illustrated. It is intended that this invention to be defined by the scope of the appended claims as broadly as the prior art will permit.

Terms such a "element," "member," "component," "device," "section," "portion," "step," "means," and words of similar import, when used herein shall not be construed as invoking the provisions of 35 U.S.C. §112(6) unless the following claims expressly use the term "means" followed by a particular function without specific structure or the term "step" followed by a particular function without specific action. Accordingly, it is not intended that the invention be limited, except as by the appended claims. All patents and patent applications referred to herein are hereby incorporated by reference in their entirety.

What is claimed is:

1. An inkjet ink, comprising a composition made by combining:

a. a colorant;

b. an inkjet vehicle; and c. a polymeric material having a formula according to Formula I, Formula II, or a mixture thereof:

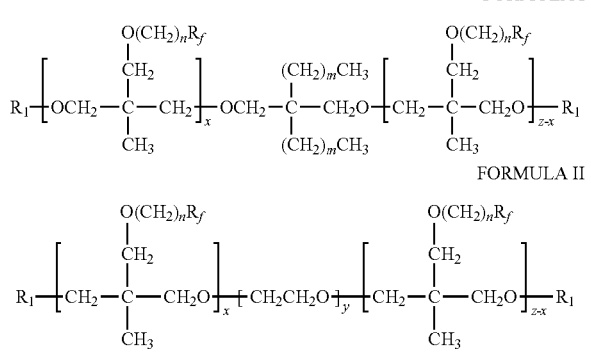

FORMULA I

FORMULA II wherein each $R_1$ polar group, independently, is selected from a group consisting of an anion-countercation; a cation-counteranion; an amphoteric group, and a nonionic group;

wherein each of the $R_f$ groups is independently selected from the group consisting of a linear fluorinated alkyl group and a branched fluorinated alkyl group, and wherein each of the $R_f$ groups has a main chain length ranging from about 1 to less than 6 carbon atoms;

wherein each $R_f$ group, independently, has at least about 10% by number of the non-carbon atoms being fluorine atoms;

wherein subscript n ranges from about 1 to about 5; subscript m ranges from 1 to 5; and B is a monomer selected from the group consisting of ethylene oxide, propylene oxide and butylene oxide;

wherein a total of (x+(z−x)) in Formula I is in a range from about 2 to about 30;

and wherein a total of (x+y+(z−x)) in Formula II is in a range from about 25 to about 45.

2. The inkjet ink according to claim 1, wherein the total of (x+(z−x)) in Formula I is in a range from about 2 to about 12.

3. The inkjet ink according to claim 1, wherein the total of (x+(z−x)) in Formula I is in a range from about 7 to about 10.

4. The inkjet ink according to claim 1, wherein n is 1.

5. The inkjet ink according to claim 1, wherein the polymeric material has the formula according to Formula II and wherein the value of y in Formula II ranges from about 0 to about 40.

6. The inkjet ink according to claim 1, wherein the polymeric material has the formula according to Formula II and wherein the value of y in Formula II ranges from about 15 to about 35.

7. The inkjet ink according to claim 1, wherein the polymeric material has the formula according to Formula II and wherein the value of y in Formula II ranges from about 15 to about 25.

8. The inkjet ink according to claim 1, wherein the polymeric material has the formula according to Formula II and wherein the value of y in Formula II is about 20.

9. The inkjet ink according to claim 1, wherein x in Formula II ranges from 0 to 8.

10. An inkjet ink according to claim 1, wherein the number of carbon atoms in the main chain length is selected from the group consisting of 2, 3 and 4.

11. An inkjet ink according to claim 1, wherein each of the $R_f$ groups is a linear fluorinated alkyl group.

12. The inkjet ink according to claim 1, wherein in each $R_f$ group, independently, the total amount of non-carbon atoms being fluorine atoms is at least about 95% by number.

13. The inkjet ink according to claim 1, wherein in each $R_f$ group, independently, the total amount of non-carbon atoms being fluorine atoms is at least about 85% by number.

14. The inkjet ink according to claim 1, wherein in each $R_f$ group, independently, the total amount of non-carbon atoms being fluorine atoms is at least about 80% by number.

15. The inkjet ink according to claim 1, wherein in each $R_f$ group, independently, the total amount of non-carbon atoms being fluorine atoms is at least 25% by number.

16. An inkjet ink, comprising a composition made by combining:
    a. a colorant;
    b. an inkjet vehicle; and
    c. a polymeric material having a formula according to Formula IV

FORMULA IV

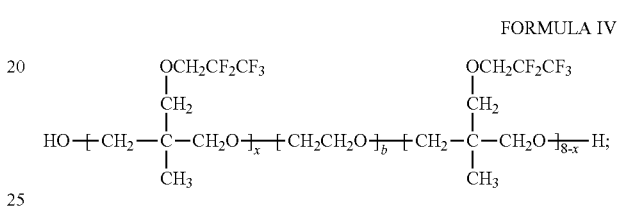

wherein x ranges from 0 to 8, and b is either 20 or 33.

17. The inkjet ink according to claim 1, wherein the $R_1$ polar groups are independently selected from the group consisting of anionic, cationic, and nonionic groups.

18. The inkjet ink according to claim 17, wherein the anionic $R_1$ group is selected from the group consisting of carboxylate, sulfonate, sulfate, phosphate, and nitrate.

19. The inkjet ink according to claim 17, wherein the cationic $R_1$ group is selected from the group consisting of ammonium, $-NH_{3-x}R_x^+$, a quaternary ammonium group, phosphonium group, and $-PH_{3-x}R_x^+$.

20. The inkjet ink according to claim 17, wherein the nonionic $R_1$ group is selected from the group consisting of poly ethers, polyether copolymers, carbonyl, carboxyl, nitrile, thiol, cyano, amido, and hydroxyl moieties.

21. The inkjet ink according to claim 1 or 16, wherein the polymeric material is added in an amount ranging from about 0.0005 wt. % to about 3.0 wt. % of the total weight of the inkjet ink.

22. The inkjet ink according to claim 21, wherein the polymeric material is added in an amount ranging from about 0.0005 to about 2 wt. % of the total weight of the inkjet ink.

23. The inkjet ink according to claim 21, wherein the polymeric material is added in an amount ranging from about 0.01 to about 1.0 wt. % of the total weight of the inkjet ink.

24. The inkjet ink according to claim 21, wherein the polymeric material is added in an amount ranging from about 0.05 to about 1.0 wt. % of the total weight of the inkjet ink.

25. An inkjet printing system, comprising:
    a. an inkjet ink according to claim 1 or 16, and
    b. an inkjet printhead configured to eject the ink.

26. The inkjet printing system according to claim 25, further comprising an inkjet printer.

27. The inkjet printing system according to claim 25, wherein the inkjet printhead is configured such that an ink supply portion is attached either temporarily or permanently to the printhead and is placeable on a chassis moving the printhead across a print medium.

28. The inkjet printing system according to claim 25, wherein the inkjet printhead is configured such that an ink supply portion is not attached to the printhead and is not placeable on a chassis moving the printhead across a print medium.

29. A method of making an inkjet ink, comprising:
   a. providing a colorant;
   b. providing an ink vehicle,
   c. providing a polymeric material having a formula according to Formula I, Formula II, or Formula IV:

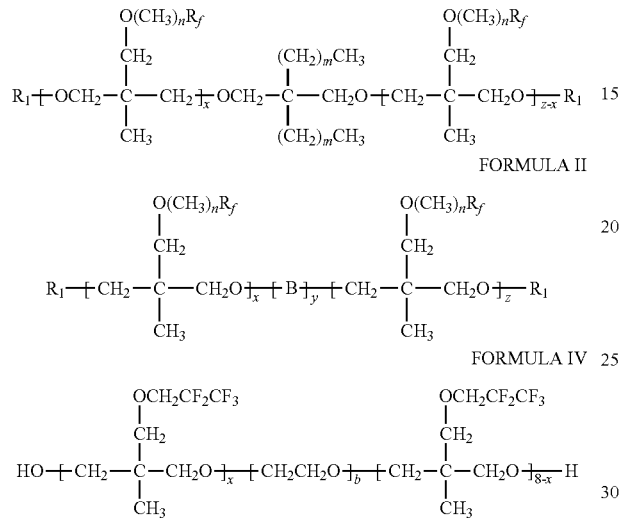

wherein for each of Formula I and Formula II:
   each $R_1$ polar group is independently selected from a group consisting of an anion-countercation; a cation-counteranion; an amphoteric group, and a non-ionic group;
   each of the $R_f$ groups is independently selected from the group consisting of a linear fluorinated alkyl group and a branched fluorinated alkyl group;
   each of the $R_f$ groups has a main chain length ranging from about 1 to less than 6 carbon atoms;
   each $R_f$ group, independently, has at least about 10% by number of the non-carbon atoms being fluorine atoms;
   subscript n ranges from about 1 to about 5; and
   subscript m ranges from 1 to 5;
wherein for Formula I a total of (x+(z−x)) is in a range from about 2 to about 30;
wherein for Formula II:
   B is a monomer selected from the group consisting of ethylene oxide, propylene oxide and butylene oxide; and
   a total of (x+y+(z−x)) is in a range from about 25 to about 45; and
wherein for Formula IV, x ranges from 0 to 8, and b is either 20 or 33; and
   d. combining the colorant, the ink vehicle, and the polymeric material in a manner so as to manufacture an inkjet ink suitable for inkjet printing.

30. An inkjet ink for use in an inkjet pen, comprising:
   a. a colorant;
   b. an inkjet vehicle; and
   c. a polymeric material in an amount effective to reduce the surface energy of the ink thereby reducing puddling of the ink on an orifice plate of a printhead of an inkjet pen, the polymeric material having a formula according to Formula I, Formula II, or Formula IV:

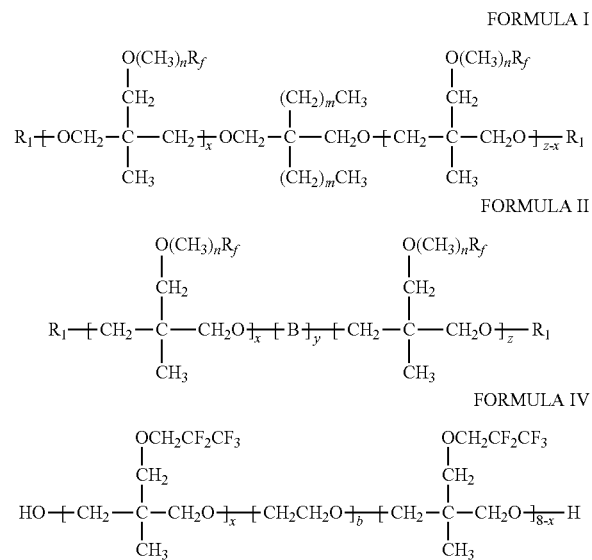

wherein for each of Formula I and Formula II:
   each $R_1$ polar group, independently, is selected from a group consisting of an anion-countercation; a cation-counteranion; an amphoteric group, and a non-ionic group;
   each of the $R_f$ groups is independently selected from the group consisting of a linear fluorinated alkyl group and a branched fluorinated alkyl group;
   each of the $R_f$ groups has a main chain length ranging from about 1 to less than 6 carbon atoms;
   each $R_f$ group, independently, has at least about 10% by number of the non-carbon atoms being fluorine atoms;
   subscript n ranges from about 1 to about 5; and
   subscript m ranges from 1 to 5;
wherein for Formula I a total of (x+(z−x)) is in a range from about 2 to about 30;
wherein for Formula II:
   B is a monomer selected from the group consisting of ethylene oxide, propylene oxide and butylene oxide; and
   a total of (x+y+(z−x)) is in a range from about 25 to about 45; and
wherein for Formula IV, x ranges from 0 to 8, and b is either 20 or 33.

31. The inkjet ink of claim 1 wherein the polymeric material has the formula according to Formula I, and wherein subscript m is 1, 4 or 5.

32. The inkjet ink of claim 16 wherein the polymeric material contributes to a reduction in puddling on an orifice plate during printing of the inkjet ink.

* * * * *

UNITED STATES PATENT AND TRADEMARK OFFICE
CERTIFICATE OF CORRECTION

PATENT NO. : 8,188,159 B2
APPLICATION NO. : 11/249598
DATED : May 29, 2012
INVENTOR(S) : Kai-Kong Iu et al.

It is certified that error appears in the above-identified patent and that said Letters Patent is hereby corrected as shown below:

In column 15, line 15, in Claim 1, delete

FORMULA II

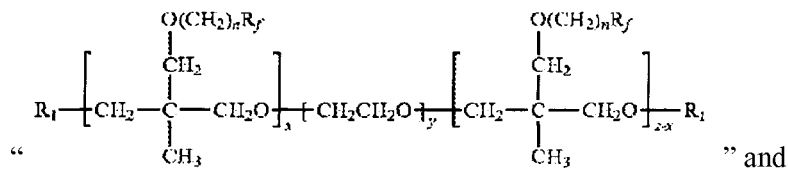

" and

FORMULA II insert -- 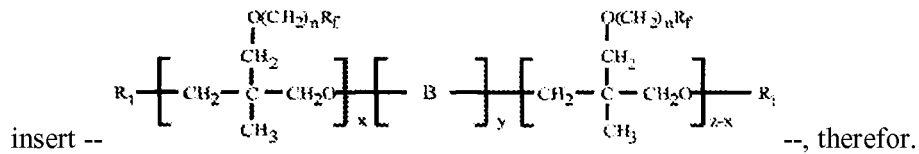 --, therefor.

In column 16, line 36, in Claim 19, delete "$-NH_{3-x}R_x^+,$" and insert -- $-NH_{3-x}R_x^+,$ --, therefor.

In column 16, line 37, in Claim 19, delete "$-PH_{3-x}R_x^+.$" and insert -- $-PH_{3-x}R_x^+.$ --, therefor.

In column 17, line 15, in Claim 29, delete

FORMULA I

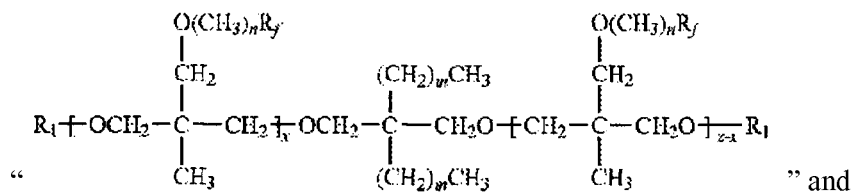

" and

Signed and Sealed this
Nineteenth Day of February, 2013

Teresa Stanek Rea
*Acting Director of the United States Patent and Trademark Office*

FORMULA I
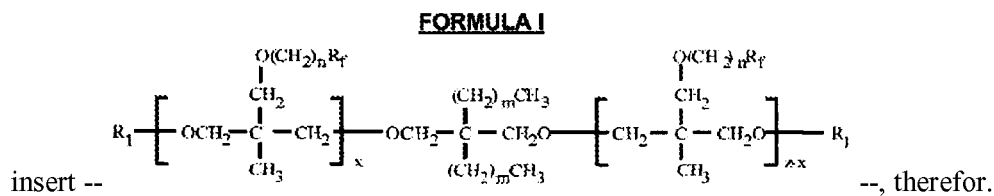
insert --                                                                                      --, therefor.
In column 17, line 25, in Claim 29, delete
FORMULA II
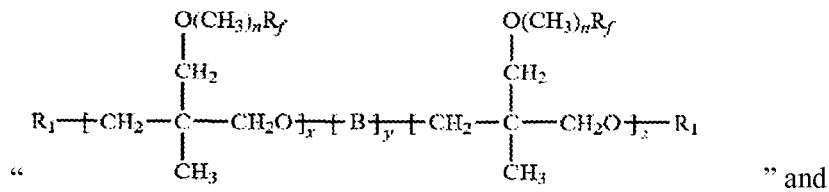
"                                                                                              " and
FORMULA II
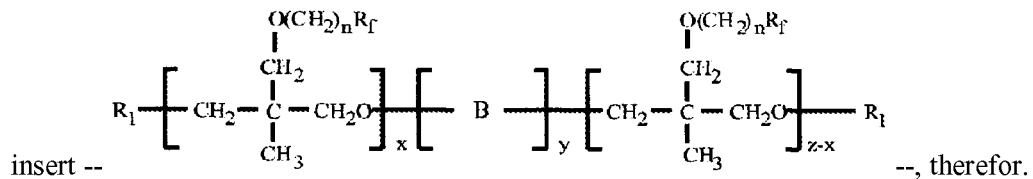
insert --                                                                                      --, therefor.
In column 18, line 12, in Claim 30, delete
FORMULA I
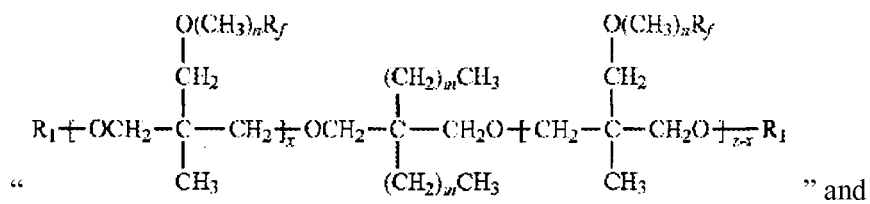
"                                                                                              " and
FORMULA I
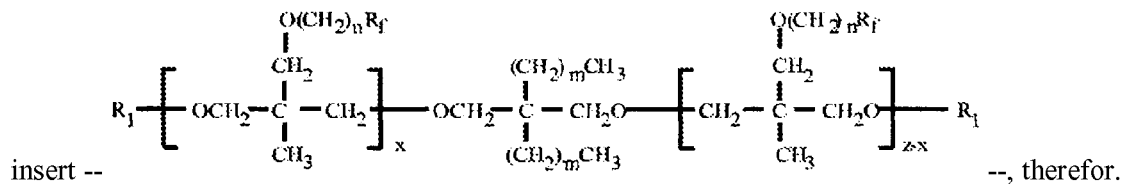
insert --                                                                                      --, therefor.
In column 18, line 20, in Claim 30, delete
FORMULA II
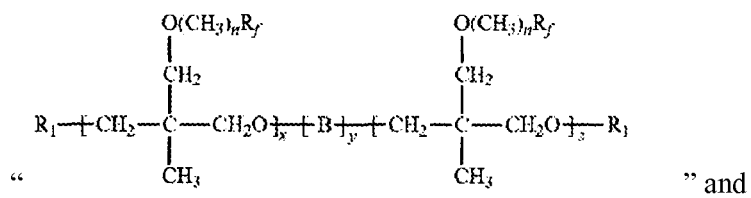
"                                                                                              " and

CERTIFICATE OF CORRECTION (continued)
U.S. Pat. No. 8,188,159 B2

FORMULA II insert -- 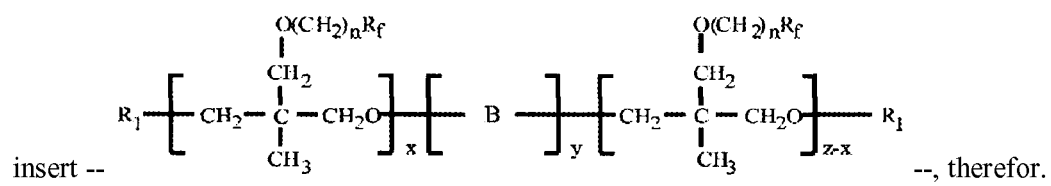 --, therefor.